L. J. ROOT.
CLUTCH.
APPLICATION FILED JAN. 16, 1920.
1,410,511. Patented Mar. 21, 1922.
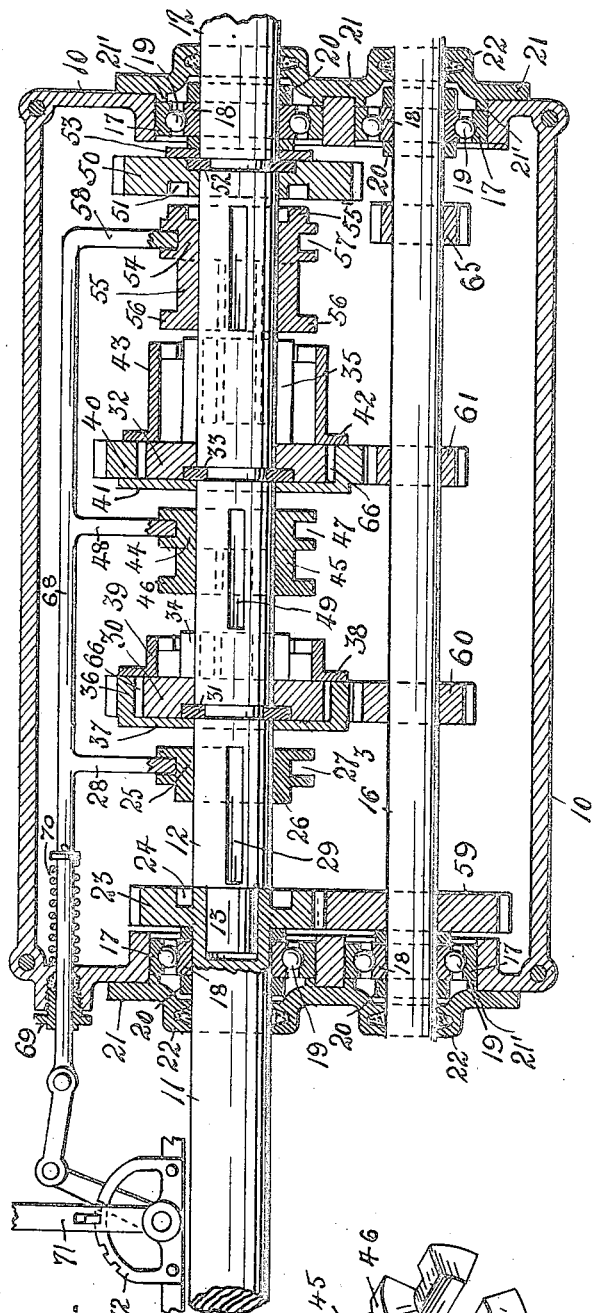
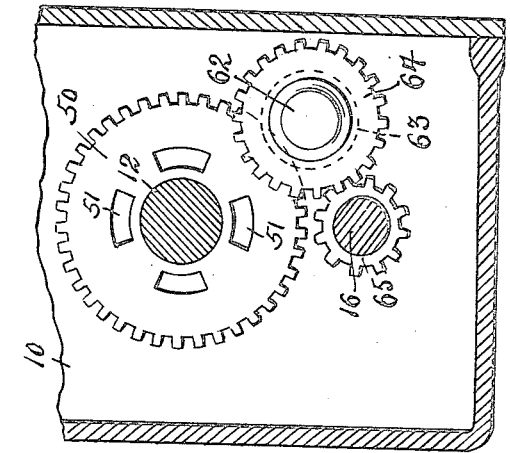
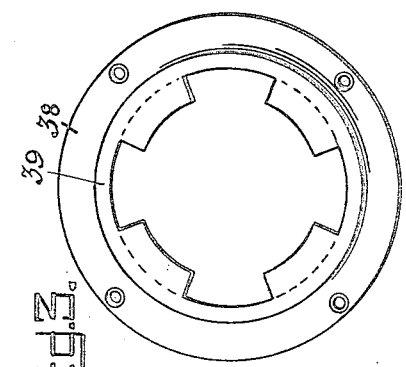
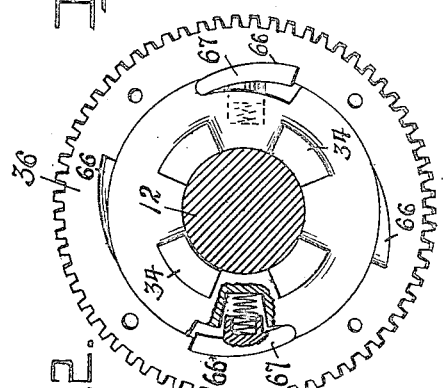
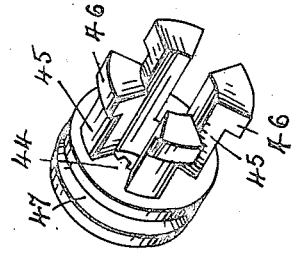
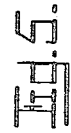
Inventor
L. J. Root,
By Geo. P. Kimmel.
Attorney

UNITED STATES PATENT OFFICE.

LEMMA J. ROOT, OF SEATTLE, WASHINGTON.

CLUTCH.

1,410,511.  Specification of Letters Patent.  Patented Mar. 21, 1922.

Application filed January 16, 1920. Serial No. 351,972.

*To all whom it may concern:*

Be it known that I, LEMMA J. ROOT, a citizen of the United States, residing at Seattle, in the county of King and State of Washington, have invented new and useful Improvements in Clutches, of which the following is a specification.

This invention relates to the transmission gearing for motor driven vehicles, and has for one of its objects to provide a simply constructed clutch adapted to be employed with a device of this character.

With this and other objects in view, the invention consists in certain novel features of construction as hereinafter shown and described and then specifically pointed out in the claims, and in the drawings illustrative of the preferred embodiment of the invention.

Figure 1 is a longitudinal sectional elevation of the improved device.

Figure 2 is an enlarged elevation, partly in section, of one of the transmission gears and its ratchet, drum and clutch element.

Figure 3 is a detached view enlarged, of one of the combined hoods and coupling plates.

Figure 4 is a detail of the reversing mechanism partly in section.

Figure 5 is a detached perspective view of one of the slidable clutch elements.

The improved device is enclosed in a suitable casing or housing, represented as a whole at 10, the latter supporting a main drive shaft 11 and a transmission shaft 12 extending in longitudinal alignment with the drive shaft, the shaft sections being coupled for rotation at their confronting ends as shown at 13.

A counter shaft 16 is likewise mounted for rotation in the frame 10, and in parallel relation to the other shafts.

The openings in the casing for the shafts are relatively large, and fitting rigidly in each opening is a wear ring 17, while a similar wear ring or collar 18 is rigidly attached to each of the shafts. The rings and collars are formed with ball channels in their confronting faces to receive bearing balls 19. By this means effectual ball bearings are provided between various shafts and the housing. Stop collars 20 are attached to the various shafts at each side of the wear collars, to prevent displacement longitudinally of the shafts.

Bearing over the openings for the shafts and the ball bearing device and attached to the housing, are cover plates 21, each cover plate having openings for the shafts with oil tight packing elements 22 surrounding the openings, to prevent the escape of oil. Each plate 21 is provided with inwardly directed ribs 21' to facilitate the centering of the plates and likewise to serve as guards to limit the outward movement of the wear rings 17.

At its inner end the main drive shaft 11 is provided with a gear 23, preferably integral with the shaft, as shown, and provided with a plurality of clutch sockets 24 in radial relation.

Slidably mounted upon the shaft section 12 is an opposing clutch element 25 having teeth 26 adapted to engage in the clutch sockets 24 when the member 25 is shifted, and provided with a grooved collar 27 to receive a shipper lever 28.

The shaft section 12 is provided with a key-way 29 in which a key, not shown, of the usual construction carried by the hub of the member 25, operates, so that the member 25 will rotate with the shaft while free to slide thereon.

A sleeve or drum 30 is mounted for free rotation on the shaft 12 in spaced relation to the clutch element 25, and held from movement in one direction longitudinally of the shaft by a thrust collar 31.

Mounted for free rotation upon the shaft 12 and spaced from the drum 30, is another and similar drum 32, held from movement in one direction longitudinally of the shaft by a thrust collar 33.

At one side the drum 30 is provided with a clutch element including spaced jaws or teeth 34 of medium length, while drum 32 is provided with like clutch jaws or teeth 35 of greater length.

Rotative upon the drum 30 is a hollow or annular gear 36 the latter having a web 37 closing one side and bearing around the shaft 12 and against the thrust collar 31.

Attached as by screws to the open side of the gear 36 is an annular plate 38 extending at its inner edge over the outer portion of the drum 30.

The thrust collar 31, the web 37 and the holding member 38 coact to maintain the drum 30 and gear 36 independently rotative on the shaft but not movable longitudinally thereof.

The holding member 38 is provided with a covering hood 39 having an inwardly directed flange bearing close to the outer faces of the clutch jaws 34 and provided with openings corresponding to the spaces between the jaws and in alignment outwardly therefrom.

Rotative on the drum 32 is a hollow or annular gear 40 having a web 41 closing one side and bearing around the shaft 12 and against the thrust collar 33.

Attached as by screws to the open side of the gear 40 is an annular plate 42 extending at its inner edge over the outer portion of the drum 32.

The thrust collar 33, the web 41, and the holding member 42 coact to maintain the drum 32 and gear 40 independently rotative on the shaft 12 but not movable longitudinally thereof.

The holding member 42 is provided with a covering hood 43 having an inwardly directed flange bearing close to the outer faces of the clutch jaws 35, and provided with openings corresponding to the spaces between the jaws and in alignment outwardly therefrom.

Slidably mounted upon the shaft section 12 between the drums 30 and 32 is another clutch element 44 having jaws or teeth 45 adapted to engage the jaws or teeth 34 of the drum 30 when the member 44 is shifted. Each of the teeth 45 is formed with an outwardly or radially projecting terminal 46 to pass respectively into the recesses of the flange of the hood 39 at the same time that the member 44 is shifted, and thus initially couple the gear 36 to the clutch element 44, at the same time that the teeth 45 are coupled to the teeth 34 of the drum 30, as hereafter explained.

The member 44 is provided with a grooved collar 47 to receive a shipper lever 48.

The shaft section 12 is provided with another key-way 49 in which a key, not shown, in the hub of the member 44, is received, so that the member 44 will rotate with the shaft and be free to slide thereon.

Mounted for rotation on the shaft section 12 is a gear 50 having clutch sockets 51 in its inner face and held from movement longitudinally of the shaft by a thrust collar 52 and an annular holding member 53, the latter attached as by screws to the gear and bearing against the outer face of the thrust collar.

Slidably mounted upon the shaft section 12 between the drum 32 and the gear 50 is another clutch element 54 having jaws or teeth 55 adapted to engage the jaws or teeth 35 of the drum 32 when the member 54 is shifted. Each of the teeth 55 is formed with an outwardly or radially directed terminal 56 to pass respectively into and through the recesses of the flange of the hood 43 at the same time that the member 54 is shifted and thus initially couple the gear 40 to the clutch element 54 at the same time that the teeth 55 are coupled to the teeth 35 of the drum 32, as hereafter explained. The member 54 is provided with a grooved collar 57 to receive a shipper lever 58.

At its opposite end the clutch member 54 is provided with clutch jaws 55' to engage in the clutch sockets 51 of the gear 50, when the member 54 is shifted in one direction.

The gears may be varied in sizes and proportions, as may be required.

Mounted rigidly on the counter shaft 16 are gears 59, 60 and 61 engaging continuously with the gears 23, 36 and 40, and varying in size to correspond to the latter.

Projecting from the housing 10 at one end, is a stub shaft 62 carrying a double gear, a relatively small gear 63 in constant engagement with the gear 50 and a relatively large gear 64 in constant engagement with a pinion 65 fast on the counter shaft 16.

By this means reverse motion may be imparted to the shaft section 12 and at reduced speed, as hereinafter more fully explained.

Formed in the inner face of each of the gear members 36 and 40 are a plurality of inclined sockets 66, and mounted in the outer face of each of the drums 30 and 32 are spring pressed pawls 67, the pawls engaging against the radial ends of the sockets and carrying the drums with them when the gears are rotated in one direction, and slipping over the sockets when the motion is reversed, or when the speeds are changed, as hereinafter explained.

The pawls 67 bear at their smaller ends in seats in the drums and are provided respectively with sleeves to support the holding springs.

The sockets 66 must compare with the jaws of the clutches to bring sockets and jaws in alignment.

Slidable through one wall of the housing is a shipper rod 68 from which the various shipper levers 28, 48 and 58 extend, so that when the rod is actuated the shipper levers and the clutch elements are simultaneously operated. The rod 68 is arranged to operate through a suitable stuffing box 69 and provided with a spring 70 to yieldably hold the rod in adjusted position.

A suitable operating mechanism for the rod 68 will be arranged in a convenient locality, and for the purpose of illustration a conventional device of this character is shown, consisting of a swinging lever 71 coupled to the rod 68 and operating over a toothed segment 72, the lever having a suitable pawl to engage the teeth and hold the lever and rod in adjusted position.

The various clutch elements 25—44—54, are so gaged as to length, that when the clutch members are disposed as shown in Figure 1, all the clutches are disconnected, or in "neutral."

To operate the improved device, if "low" speed is required, the operating lever 71 is moved forward to connect its pawl with the second tooth or notch in the segment which will move the clutch member 54 far enough to engage the outer parts of its teeth 55 with the outer portions of the jaws or teeth 35 of the drum 32, and likewise engage the projections 56 in the recesses of the flange of the hood 43, and thus couple the drum 32 and the gear 40 to the shaft 12 and also cause the pawls 67 to engage the radial ends of the sockets 66 and rotate the shaft 12 at "low" speed owing to the proportionate sizes of the gears 40 and 61. This operation will not engage either the teeth 26—45, with their respective clutch sockets or teeth, as the clutch elements 25 and 44 will not be moved far enough to accomplish this.

If a medium speed is required, the lever 71 is moved to engage its pawl with the next notch in the segment which will shift the rod 68 and its various shipper levers another distance which movement will cause the teeth 55 to travel a greater distance between the jaws 35 and will likewise move the projections 56 into the interior of the hood 43 and free from the flange thereof, so that the projections will not interfere with the independent operation of the gear and drum. This movement of the lever 71 will likewise move the teeth 46 into engagement with the teeth 34 of the clutch element 30 and transmit the higher speed of the gears 36 and 60 to the shaft 12, in the same manner as above described.

If "high" or direct transmission is required, the lever 71 is moved to cause its pawl to engage the last notch at the outer end of the segment which movement will cause the teeth 46 and 56 of the clutch members 44 and 54 to be moved still further into the spaces between the jaws or teeth 34 and 35, and at the same time causing the teeth 26 of the clutch element 25 to enter the sockets 24 of the direct action gear 23, and thus transmit the motion direct from the drive shaft 11 to the driven shaft 12. At the same time that the clutch element 44 is shifted the projections 46 enter the spaces in the flange of the hood 39 in the same manner as before described in connection with the "low" speed gearing, and with a like effect.

The increase of speed of the shaft 12 will not affect the gears 36 and 60 or 40 and 61, as the higher speed imparted to the shaft 12 will simply cause the gears 36 and 40 to "slip" or "lag" over the pawls 67 associated therewith by reason of the inclined form of one side of the sockets 66, as will be obvious.

If the motion is to be reversed, the lever 71 is simply moved until its pawl engages the last notch in the segment at the rearward end, which will cause the rod 68 to move all the clutch elements away from their respective gears and drums and cause the teeth 55′ of the clutch member 54 to enter the sockets 51 of the gear 50 and thus transmit the motion of the reversely running gear 50 to the shaft 12 and correspondingly reversing the motion of the latter and at reduced speed.

The improved device is compact and simple in construction, of few parts, direct in action, and can be modified and adapted without material structural change to devices of various kinds, but is more particularly adapted to automobiles, autotrucks, tractors, and similar vehicles.

What I claim is:

1. In an apparatus of the class described, a driven shaft having a thrust collar, a gear including an annular rim and rotative upon the shaft against the thrust collar, said rim having inwardly directed ratchet teeth, means for constantly rotating said gear, a drum rotative on the shaft and against the thrust collar and having clutch elements, an annular holding member attached to said gear and extending over the drum and coacting with the thrust collar to hold the gear and drum from movement longitudinally of the shaft, pawl devices carried by the drum and engageable with the ratchet teeth, and an opposing clutch element slidable on the shaft and rotative therewith and adapted to be engaged with the clutch element of the drum.

2. In an apparatus of the class described, a driven shaft having a thrust collar, a gear including an annular rim and rotative upon the shaft against the thrust collar, said rim having inwardly directed ratchet teeth, means for constantly rotating said gear, a drum rotative on the shaft and against the thrust collar and having clutch jaws in spaced relation extending therefrom, an annular holding member attached to said gear and extending over the drum and coacting with the thrust collar to hold the gear and drum from movement longitudinally of the shaft, an annular hood extending from said holding member and over the clutch jaws of the drum and formed with an inwardly directed guard flange provided with recesses corresponding to and in radial alignment with the spaces between the clutch jaws, pawl devices carried by the drum and engageable with the ratchet teeth, and an opposing clutch element slidable on the shaft and rotative therewith and including clutch jaws each having a radial projection adapted to respectively pass through the recesses of the hood flange.

3. In an apparatus of the class described, a driven shaft, a gear, including an annular rim and rotative upon the shaft, means for constantly rotating said gear, a drum rotative on the shaft and having clutch jaws, an annular holding member attached to said gear and including a hood extending over said clutch jaws and having a flange provided with recesses registering with the spaces between said clutch jaws, an opposing clutch member slidable on the shaft and rotative therewith and provided with jaws corresponding to the jaws of the drum and radial projections corresponding to the flange recesses of the hood.

In testimony whereof, I affix my signature hereto.

LEMMA J. ROOT.